United States Patent [19]

Valiant

[11] 4,175,703
[45] Nov. 27, 1979

[54] SPRAY COOLING SYSTEM FOR GABLE ROOF

[75] Inventor: Edgar W. Valiant, Woodstock, Ga.

[73] Assignee: Spraycool, Inc., Roswell, Ga.

[21] Appl. No.: 859,168

[22] Filed: Dec. 9, 1977

[51] Int. Cl.² ............................................. B05B 15/00
[52] U.S. Cl. ....................................... 239/208; 169/16
[58] Field of Search ............... 239/207, 208, 209, 547; 169/16

[56] References Cited

U.S. PATENT DOCUMENTS

| | | | |
|---|---|---|---|
| 1,285,236 | 11/1918 | Kohler | 169/16 X |
| 1,620,142 | 3/1927 | Thompson | 239/208 |
| 1,831,880 | 11/1931 | Pierce | 239/208 X |
| 2,757,965 | 8/1956 | Andrews | 239/207 X |

*Primary Examiner*—John J. Love
*Attorney, Agent, or Firm*—Robert B. Kennedy

[57] ABSTRACT

A spray cooling system for gable roofs having inclined first and second roof sections that intersect at a roof summit. The system comprises a conduit mounted atop the first roof section adjacent to the roof summit adapted to be connected with a supply of liquid coolant. The conduit has a first series of ports through which liquid coolant may be sprayed upon the first roof section and a second series of ports through which liquid coolant may be directed over the roof summit and sprayed upon the second roof section.

7 Claims, 7 Drawing Figures

SPRAY COOLING SYSTEM FOR GABLE ROOF

BACKGROUND OF THE INVENTION

This invention relates generally to spray cooling systems, and particularly to spray cooling systems for gable roofs of the type commonly employed in the construction of single and multiple family dwellings.

As noted in the January, 1960 issue of *Piping and Air Conditioning*, spray cooling systems have heretofore been constucted and utilized in cooling industrial buildings. In general, the system consists of a pipe mounted upon the building roof which is pierced at numerous locations. The pipe is connected to a supply of water through conventional valve control means. Periodically, the valve is operated whereupon water is forced through the pierced holes in the pipe and sprayed as a sheet of water in an overlapping pattern directly from the pipe onto the building roof. Thereupon solar heat evaporates the water upon the roof absorbing some 8500 BTUs of heat in the process for each gallon of water employed. This action inhibits a buildup of heat beneath the building roof thereby serving to cool the building interior. In many of these industrial usages the sheet-spray also tends to eleviate fly ash problems where considerable amounts of paper are burned daily in the vicinity of the building. In addition, this system may be utilized in an emergency as a fire extinguisher.

Though industrial roof spraying systems of the type just described have enjoyed commercial success in cooling industrial buildings, they have not met with any marketed degree of acceptance in the residential building market. Probably the foremost reason for lack of success here is attributed to the absence of system aesthetics. The placement of conduits atop the roofs of family dwellings can easily render them quite unattractive. They quite naturally endower the residential house or apartment with an industrial type of esthetic effect.

The design of residential buildings also differs ordinarily in one important way that lessens the efficiency of the prior art roof spray cooling systems where used therewith. Normally the ratio of roof to wall areas is substantially higher in modern industrial buildings. Since exterior to interior heat transfer occurs both from the roof as well as walls, the net effect of adopting an industrial roof cooling system of the prior art onto a residential building is lessened. The present invention overcomes these and other problems in an unique manner thereby permitting spray systems now to be built and incorporated into existing as well as new residential buildings with enhanced operating efficiency and without substantial harm to the appearance of the building from its principal viewpoint.

Accordingly, it is a general object of the present invention to provide a spray cooling system for gable roofs of the type utilized in residential construction.

More specifically, it is an object of the invention to provide a spray cooling system for a gable roof in which working components of the system may be hidden from view from a principal side of the dwelling.

Another object of the invention is to provide a spray cooling system of the type described whose operation tends to cool the sides of the residential building as well as its roof.

Another object of the invention is to provide a spray cooling system of the type described which is readily adapted to various degrees of roof pitch.

Yet another object of the invention is to provide a spray cooling system of the type described which does not tend to become clogged or plugged over prolonged periods of operation which in turn negates the need for frequent maintenance.

SUMMARY OF THE INVENTION

In one form of the invention a spray cooling system is provided for a gable roof having inclined first and second roof sections that intersect at a roof summit. The spray cooling system comprises a conduit mounted atop the first roof section adjacent the roof summit adapted to be connected to a supply of liquid coolant. The conduit has a first series of ports through which liquid coolant may be sprayed upon the first roof section, and a second series of ports through which liquid coolant may be directed over the roof summit and sprayed upon the second roof section.

In another preferred form of the invention a spray cooling system is provided for a gable roof having inclined first and second roof sections that merge at a common roof ridge. Here the spray cooling system comprises first spray means mounted on the first roof section for applying an overlapping pattern of spray upon the first roof section, and second spray means mounted also on the first roof sections for simultaneously applying an overlapping pattern of spray upon the second roof section.

DESCRIPTION OF THE PREFERRED EMBODIMENT

Figure 1:
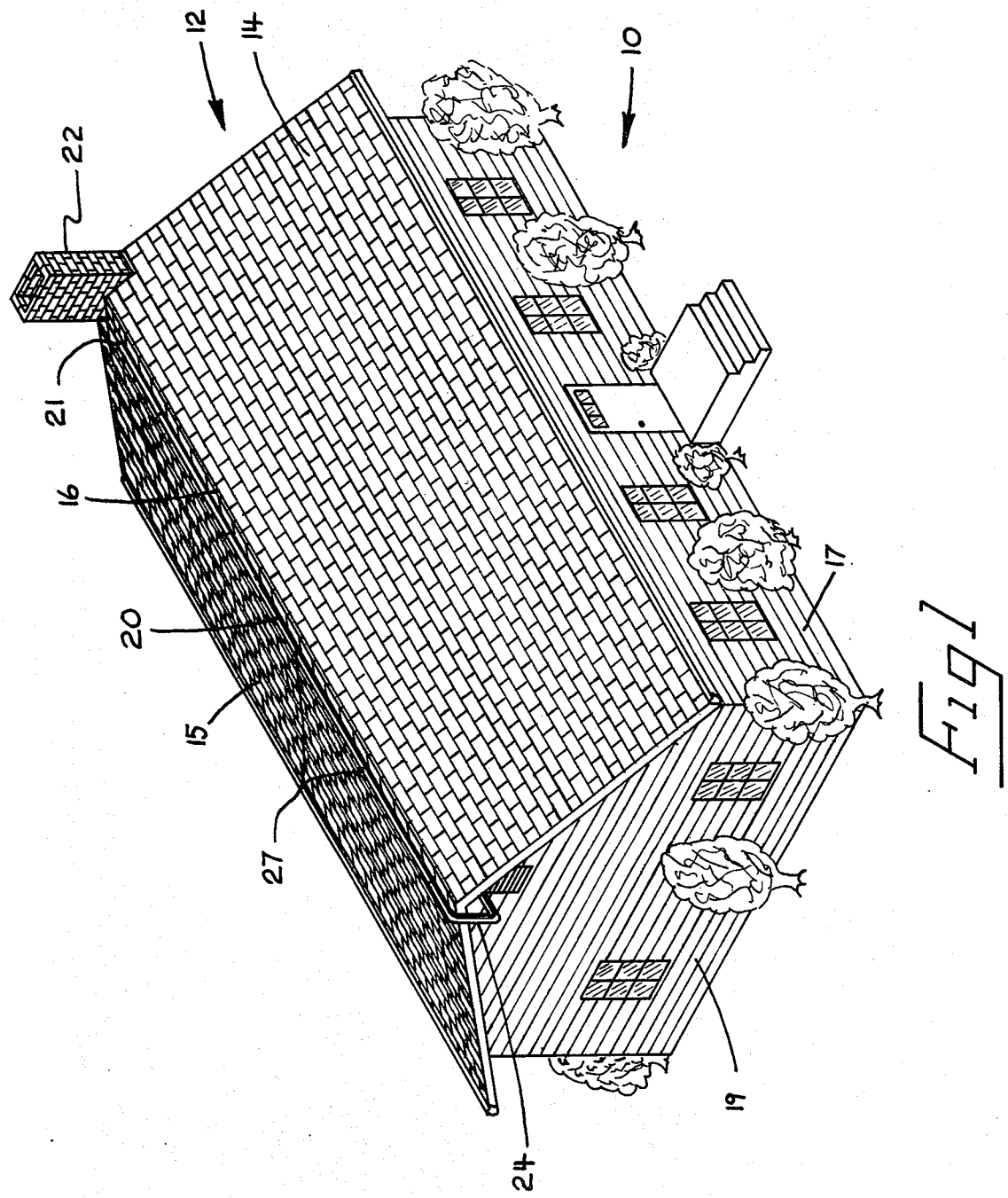
FIG. 1 is a perspective view of a home having a gable roof upon which a spray cooling system embodying principles of the present invention is mounted.
Figure 2:
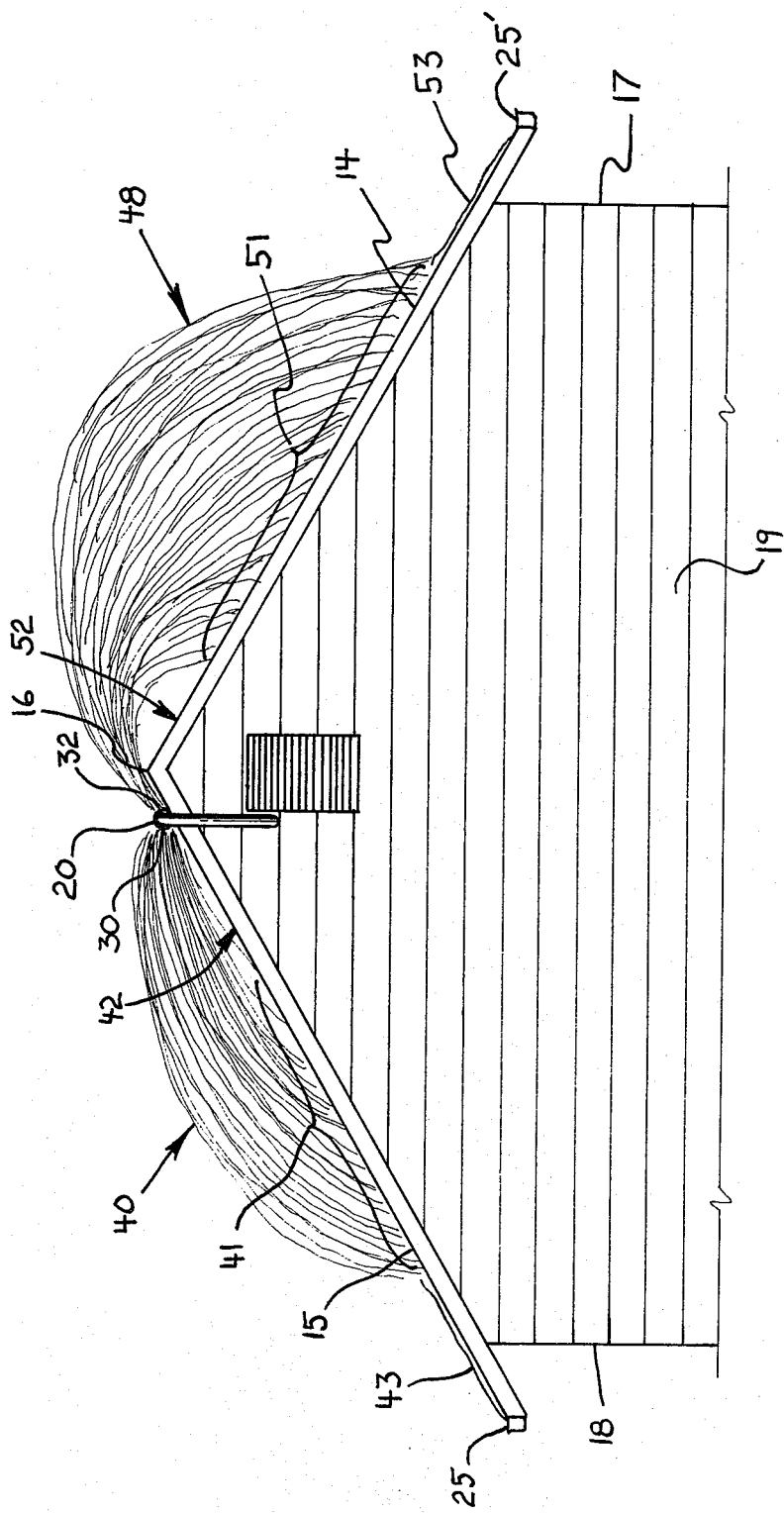
FIG. 2 is a side elevational view of an upper side portion of the home shown in FIG. 1.
Figure 3:
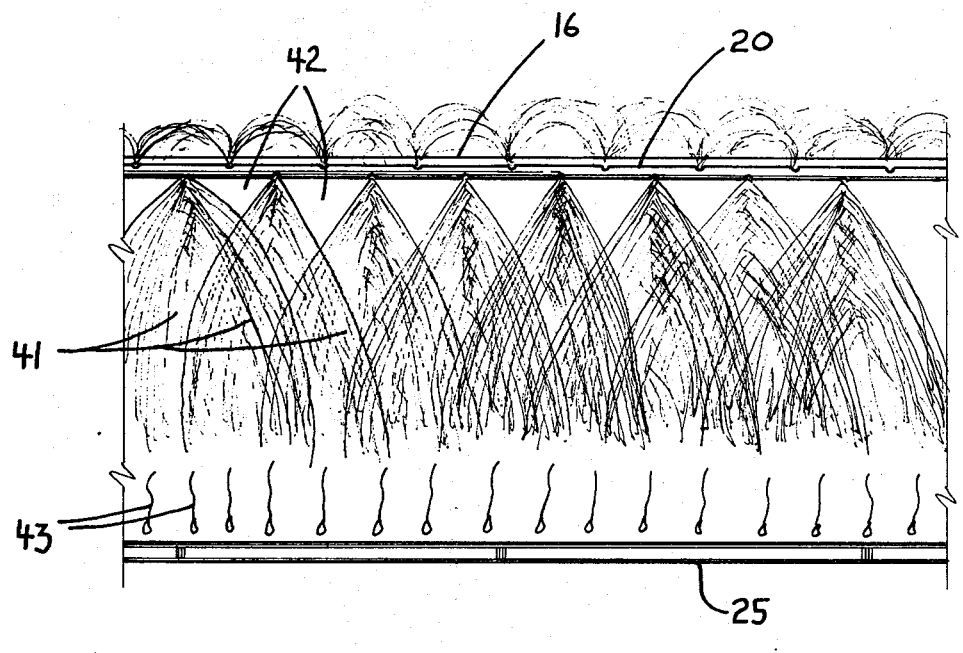
FIG. 3 is a rear elevational view of the portion of the rear roof section of the home shown in FIGS. 1 and 2.
Figure 4:
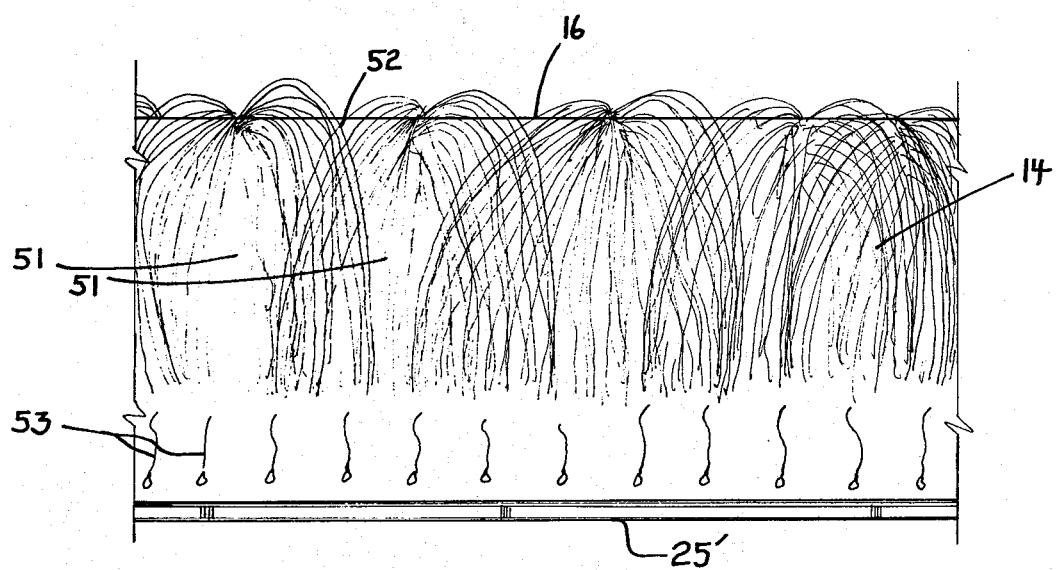
FIG. 4 is a front elevational view of a portion of the front roof section of the home shown in FIG. 1.

Referring now to more detail of the drawing, there is shown in FIG. 1 a house again having a gable roof 12 which comprises a rectangular, inclined, planar front roof section 14, and a rectangular, inclined, planar rear roof section 15 that merges with the front roof section at a roof summit or ridge 16. The house also has a front exterior wall 17, a rear wall 18, and opposed side walls 19. In this embodiment the roof is composed of conventional overlapping wooden shingles while the house walls are formed of conventional overlapping wood strips.

The spray cooling system for the just described building includes an elongated conduit 20 which may be composed of polyvinyl chloride or PVC that can be readily glued together in sections by unskilled labor. The elongated conduit terminates at an end 21 adjacent to the building chimney 22 while the opposite end of the conduit is provided with a L-shaped section 24 that provides communication between conduit 20 and a supply of tap water within the dwelling through conventional valve means. The conduit 20 seemed to be mounted horizontally and parallel with, but slightly offset from, the roof summit 16. The conduit here is offset some six inches from the roof summit on a roof section whose width from summit to lower edge and gutter 25 is some 25 feet. The reason for this will be hereinafter explained.

Figure 6:
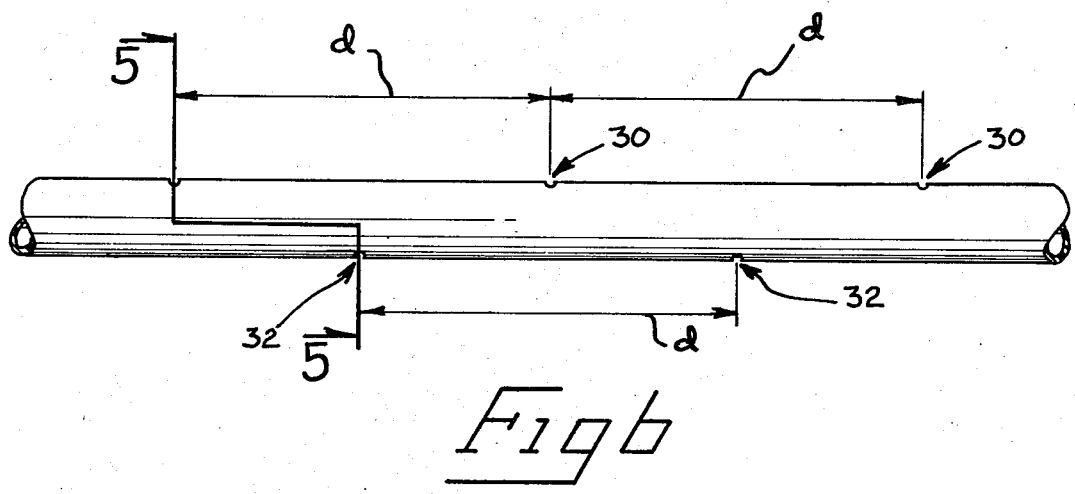
FIG. 6 is a plan view of a portion of the conduit shown in FIG. 1.
Figure 7:
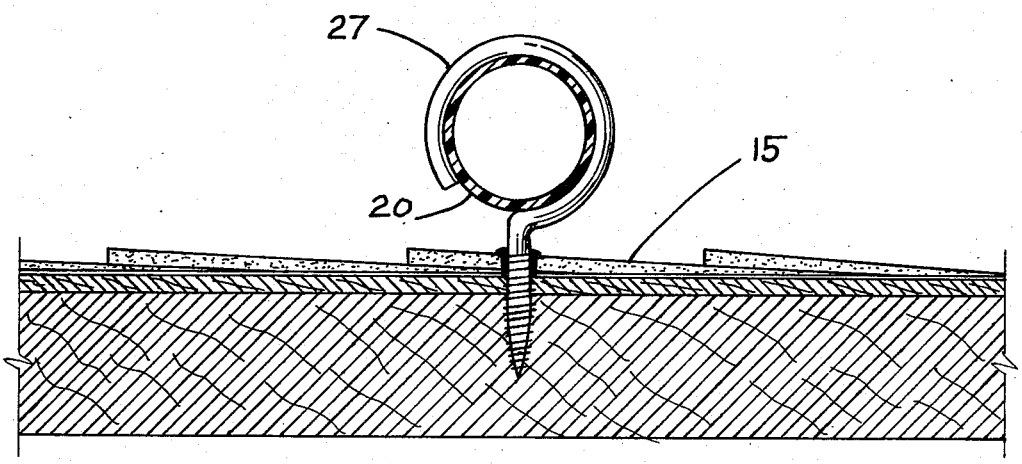
FIG. 7 is a transverse sectional view of the conduit and mount shown in FIG. 1.

The conduit 20 is mounted atop the roof section 15 by means of a series of eye-bolts 27 as shown in FIG. 7. The conduit is formed with a first series of ports 13 formed in one side and a second series of ports 32 formed in the opposite side thereof as shown in FIG. 6. The ports of each series are spaced axially apart a distanced here of thirty inches to provide an overlapping pattern of spray as hereinafter described.

Figure 5:
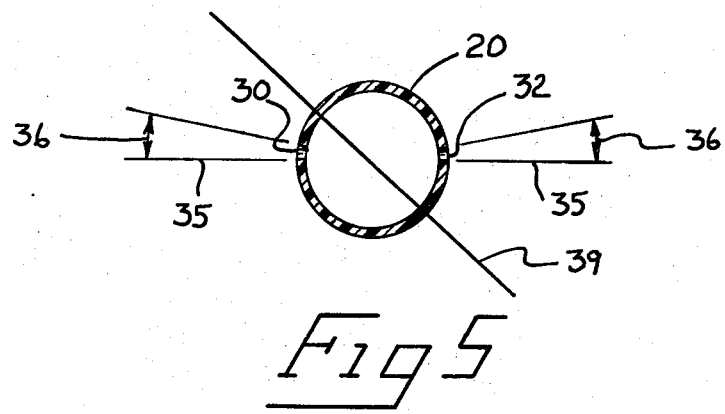
FIG. 5 is a cross-sectional view of a spray cooling system couduit shown mounted to the roof in FIG. 1.

With reference next to FIG. 5, each port is seen to be of trunco-conico configuration with the walls of opposite ports being tangent to a common plane 35. The conical walls of the ports are preferably formed with a spread 36 of eleven degrees. In mounting the conduit to the gable roof it is rotated so that the ports 30 and 32 are offset from the horizontal plane 39 parallel with the roof section 15.

With the system mounted for operation it may be actuated by opening the unshown valve thereby permitting water under pressure to flow through the U-shaped conduit 24 and into the elongated conduit 20. From here the water flows out of the conduit through the two series of ports 30 and 32 and onto the two roof sections as shown in FIGS. 2–4. As the water flows out of ports 30 it sprays outwardly and above the roof section 15 in an airbourne spray pattern 40. It then strikes the overlapping, fan-shaped areas 41 of the roof. Above these areas 41 some mist from the spray settles upon areas 42 while below areas 41 runoff 43 flows down into gutter 25.

Simultaneously with the just described action, water also flows out of ports 32 in spray patterns 48 that extends upwardly and outwardly from conduit 20 over summit 16, then into the air space above roof section 14, and then onto overlapping fan-shaped areas 51 of roof section 14. Here again some of the overflying spray settles upon roof areas 52 while below areas 51 runoff 53 occurs down into gutter 25'.

With the just described action a number of benefits are simultaneously derived. Firstly, it should be noted that conduit 20 is completely hidden from view from the front of the house. What is seen from this principle side of the house during operation is that shown in FIG. 4 wherein a pattern of spray overshoots summit 16 while none of the actual aparatus from which the spray is emitted is viewed. Secondly, the pattern of the spray on the roof is such to cover virtually the entire building roof with either spray, settling mist, or runoff. Thirdly, no heavy gravel is required to absorb puddles.

In addition to the foregoing benefits, the pattern of airbourne spray is also such as will cool the volume of the space above the building roof in addition to the roof itself. Thus, the heat from evaporation of water from the roof acts to directly cool the roof sections while the cooling of the airspace above the roof enable cooler air to settle about the house thereby cooling the house sides in the process. Roof life is prolonged since the operation of the spray tends to inhibit the sum from baking out the oils in the shingles.

As shown in FIG. 7, the conduit may be mounted very easily and with inexpensive labor atop the building roof. The conical construction of the ports inhibits clogging action since a higher velocity of liquid occurs at the narrow neck of the ports. That the two series of mutually offset ports are located along a common plane adds flexability to the system insomuch as various degrees of roof pitch may be accomodated by merely rotating the conduit to align the two series parallel the roof section. With this location of ports substantially along a common plane the conduit may also be used without reconstruction or relocation of the ports upon horizontal roofs. In other words, it may be interchangeably used with residential gable or flat industrial or residential roofs. If desired, the system valve may be manual or automatically controlled by conventional timer and thermostatic controls.

It should be understood that the just described embodiment really illustrates principles of the invention in one preferred form. Many modifications, additions and deletions may be, of course, be made thereto without departure from the scope of the invention as set forth in the following claims.

I claim:

1. A spray cooling system for a gable roof (in accordance with claim 1) having inclined first and second roof sections that intersect at a roof summit, said spray cooling system comprising a conduit mounted atop said first roof section adjacent said roof summit adapted to be connected with a supply of liquid coolant, and with said conduit having a first series of ports in a side of said conduit facing said first roof section and a second series of ports facing said roof summit, and wherein said conduit is of generally hollow, cylindrical configuration and is mounted atop said roof first section substantially horizontally (whereby) with a horizontal plane (bisects) bisecting the conduit into upper and lower conduit halves, and wherein said first series of ports is located in said lower conduit half and said second series of ports is located in said upper conduit half, whereby liquid coolant may be sprayed onto the first roof section from the first series of ports and sprayed over the roof summit upon the second roof section from the second series of ports.

2. A spray cooling system for a gable roof in accordance with claim 1 wherein said ports are of truncated conical shape.

3. A spray cooling system for a gable roof in accordance with claim 1 wherein said first and second series of ports are located in substantially diametrically opposed portions of said conduit.

4. A spray cooling system for a gabled roof in accordance with claim 3 wherein said first roof section lies in an inclined plane and wherein said first and second series of ports are located substantially diametrically opposed along an inclined plane substantially parallel said first roof inclined plane.

5. A spray cooling system for a gable roof having inclined first and second roof sections that merge at a common roof ridge and with the spray cooling system comprising first spray means mounted on said first roof section spaced from the roof ridge for applying an overlapping pattern of spray in the airspace above and upon said first roof section, and second spray means mounted on said first roof section spaced from the roof ridge for simultaneously applying an overlapping pattern of spray in the airspace above and upon said second roof section.

6. A spray cooling system for a gable roof in accordance with claim 5 wherein said first and second spray means include a common conduit.

7. A spray cooling system for a gable roof in accordance with claim 6 wherein said common conduit is mounted atop said first roof section spaced from and substantially parallel with the common roof ridge.

* * * * *